United States Patent [19]

Musha et al.

[11] Patent Number: 4,641,196

[45] Date of Patent: Feb. 3, 1987

[54] METAL RING PREVENTING IMPLOSION OF CATHODE-RAY TUBE

[75] Inventors: Kazuhiko Musha, Nagoya; Kohichi Tago; Hidetoshi Kato, both of Ichinomiya, all of Japan

[73] Assignee: Sony Corporation, Tokyo, Japan

[21] Appl. No.: 674,958

[22] Filed: Nov. 16, 1984

[30] Foreign Application Priority Data

Mar. 16, 1983 [JP] Japan .................................. 58-43807

[51] Int. Cl.[4] .................................................. H04N 5/65

[52] U.S. Cl. .................................... 358/246; 358/245; 220/2.1 A

[58] Field of Search ........................ 358/245, 246, 248; 220/2.1 A, 71, 73

[56] References Cited

U.S. PATENT DOCUMENTS 3,576,395 4/1971 Arrington et al. .................. 358/245

4,295,574 10/1981 Nakajima et al. .................. 358/245

*Primary Examiner*—James J. Groody

*Assistant Examiner*—John K. Peng

*Attorney, Agent, or Firm*—Hill, Van Santen, Steadman & Simpson

[57] ABSTRACT

A metal ring preventing the implosion of a cathode-ray tube is fitted on a maximum outer peripheral length part, i.e., the so-called mold match line formation part, of a cathode-ray tube (the so-called Braun tube) of a television receiver in order to provide an implosion-proof cathode-ray tube. The cathode-ray tube implosion-preventing metal ring (10) is formed so that at least two metal strip members (11) are each formed with welding reference projections (13) at the end portions thereof, and these metal strip members (11) are bent so that an annular body formed by connecting these metal strip members (11) has a shape similar to the mold match line formation part of the cathode-ray tube, and they are then welded together while being positioned by the welding reference projections (13). It is also possible to provide a bending reference projection (14) in the central portion of each metal strip member (11), and bend each metal strip member (11) while positioning it by means of the projection (14). For each welding reference projections (13) and the bending reference projections (14), a rectangular part formed on each metal strip member (11) which projects in the widthwise direction thereof and has a predetermined length in the longitudinal direction thereof is sufficient. It is also possible to provide a fixing part (15) on each metal strip member (11), and also form a step on at least the part of each metal strip member (11) including the fixing part (15).

5 Claims, 10 Drawing Figures

METAL RING PREVENTING IMPLOSION OF CATHODE-RAY TUBE

TECHNICAL FIELD

This invention relates to a metal ring preventing implosion of cathode-ray tube for providing an implosion-proof cathode-ray tube (so-called Braun tube) of a television receiver.

BACKGROUND

It is known to provide an implosion-proof cathode-ray tube by means of a metal ring which is comprised of at least one band-like metal strip member connected at least at one part and which is fitted by a so-called shrinkage fit on the maximum peripheral length part, or the so-called mold match line formation part, of the cathode-ray tube panel.

The aforementioned reinforcement shrinkage fit is briefly explained. There is prepared a metal ring having an inner peripheral length less than the peripheral length of the mold match line part of the cathode-ray tube, which represents the maximum peripheral length part of the tube, at least one connecting portion formed by caulking or welding, and a shape similar to the mold match line part. This metal ring is heated or baked so that the inner peripheral length of the ring is equal to or slightly larger than the outer peripheral length of the mold match line part owing to the resulting thermal expansion of the ring. The mold match line part of the cathode-ray tube is provided with a viscous adhesive layer such as an adhesive tape about which the metal ring is fitted after it is heated and expanded in the above described manner. The metal ring is allowed to cool to be contracted so that a clamping tension of the metal ring is developed so as to assure an implosion-proof reinforcement of the metal ring.

This clamping tension is determined as the strain or deformation $\Delta l$ which is the difference between the original peripheral length l of the metal ring (the length prior to fitting of the metal ring on the cathode-ray tube) and the peripheral length thereof after fitting of the ring on the cathode-ray tube.

FIG. 1 shows a strain-stress curve for the metal ring which is prepared by forming a band-like strip member 1.2 mm thick and 20 mm wide to an annular body having a peripheral length l approximately equal to 1141 mm and a shape similar the mold match line part. In this figure, the ratio of strain or deformation $\Delta l$ to the peripheral length l ($\Delta l/l$) in percent (%) ($\Delta l/l \times 100\%$) is plotted on the horizontal axis and the stress in kg/mm$^2$ is plotted on the vertical axis. The area of the strain between 0% and e.g. 0.13% is an elastic area in which the stress is changed in proportion to the strain. The area of plastic deformation is the area in which the strain is increased to higher than that applied in the elastic area. Within this plastic deformation area, there is a sub-area in which the strain is changed but the stress remains constant. It is this sub-area which is useful for providing the constant clamping tension of the metal ring.

On the other hand, it is not always possible to make the outer peripheral length of the mold match line part of the cathode-ray tube or the inner peripheral length of the metal ring constant because of possible dimensional errors. For example, the outer peripheral length of the mold match line part is necessarily changed within the manufacture tolerances with difference in the metal dies or press lots or wear caused to the press dies. It is therefore necessary that the dimensional errors be reduced to the smallest value possible in order that the strain be confined within the above described useful area. In the example of FIG. 1, the range of strain from about 0.13% to about 0.9% represents the useful area for which the stress remains constant at approximately 30 kg/mm$^2$. The method of manufacture of the metal ring so far employed for reducing the manufacture or dimensional error of the mold match line part of the cathode-ray tube is as follows: The band-like steel strip member, for example, is previously machined substantially to the shape of the mold match line part of the cathode-ray tube by forming or press working. The part 1 such as the band-like steel strip member machined in the above described manner is placed about a mold 2 having a peripheral length shorter by a constant length than the outer peripheral length of the mold match line part, and pulled with a force F. Alternatively, the part 1 is wound about a form 2 designed for setting the peripheral length of the metal ring, and then it is pressed with a force F by a press jig 3. The parts 1 shown in FIG. 2 or 3, the peripheral length and shape of which are previously determined in the above described manner, are welded at least one portions thereof by a back-side welding electrode 4 and a front-side welding electrode 5 for providing a completed metal ring.

In the conventional manufacture method shown in FIGS. 2 and 3, the parts such as steel strip members are prestressed in tension during the machining step which determines the peripheral length or shape of the metal ring, and the parts are connected together in this state by welding. It is therefore necessary that the springback to which the steel strip member is subject be taken into account in setting the equipment conditions. The springback of the steel band etc. tends to be changed as a function of the fluctuations in the tension applied to the steel strip member so that it is extremely difficult to reduce the tolerance of the peripheral length of the metal ring to a smaller value.

It is also known that the parts formed or press worked in the above described manner are connected together at least at one point thereof to an annular body by a welding operation, after which a force is applied from the inside of the annular body for expanding it to the plastic deformation area so as to assure the desired inner peripheral length. However, it is difficult to elevate machining accuracy of the inner peripheral length of the metal ring because of the fluctuations in the peripheral length caused during the previous welding operation or the fluctuations in the springback caused at the time of expanding the metal ring.

The present invention has been made in consideration of the above described status of the prior art and contemplates to provide a cathode-ray tube implosion-preventing metal ring which is simple in construction, easy to manufacture and capable of reducing the dimensional error of the peripheral length of the metal ring to a smaller value.

DISCLOSURE OF THE INVENTION

In view of the foregoing, the present invention provides a metal ring adapted to be fitted on a maximum outer length part of a cathode-ray tube for preventing the implosion of the cathode-ray tube, wherein the metal ring is comprised of at least two metal strip members each formed with welding reference portions at the end portions thereof, said strip members are bent so that an annular body formed by connecting these metal strip members has a shape similar to said maximum peripheral length part of the cathode-ray tube, and wherein said metal strip members are welded together while being positioned by said welding reference projections. Since it is no longer necessary to prestress the band-like metal strip members in tension during the bending or welding operations, the dimensional error in the peripheral length of the metal ring can be reduced to a smaller value so that equipment condition control is facilitated.

BEST MODE FOR EXECUTING THE INVENTION

Reference is now made to the accompanying drawings in which there is illustrated a preferred embodiment of the metal ring preventing implosion of cathode-ray tube according to the present invention.

Figure 1:
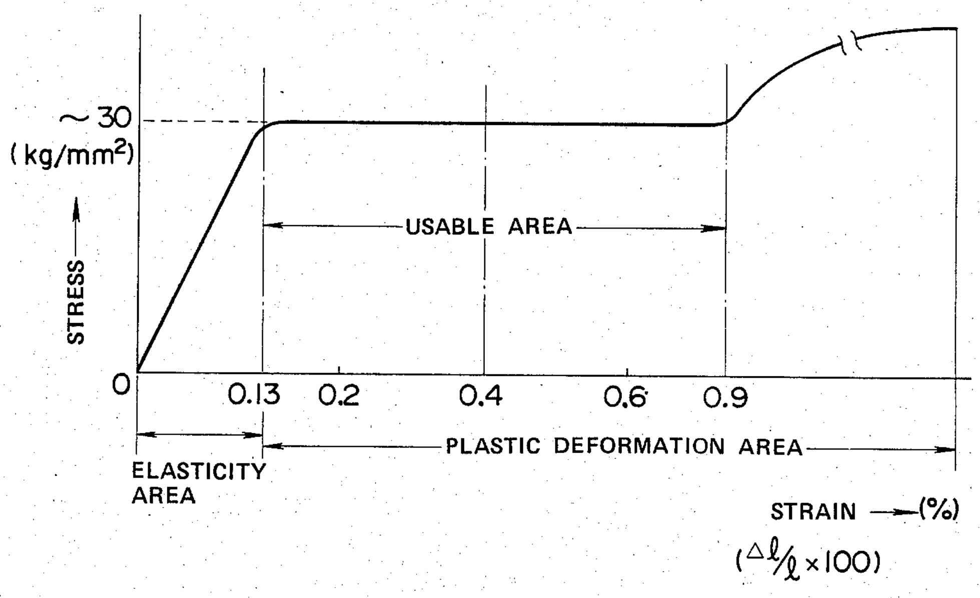
FIG. 1 is a graph showing a strain-stress curve for a conventional metal ring preventing implosion of cathode-ray tube.
Figure 2:
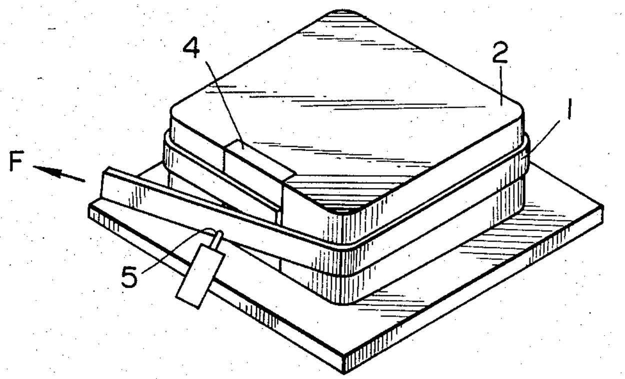
PRIOR ART FIG.2
FIGS. 2 and 3 are a perspective view and a plan view showing different prior-art examples, respectively.
Figure 3:
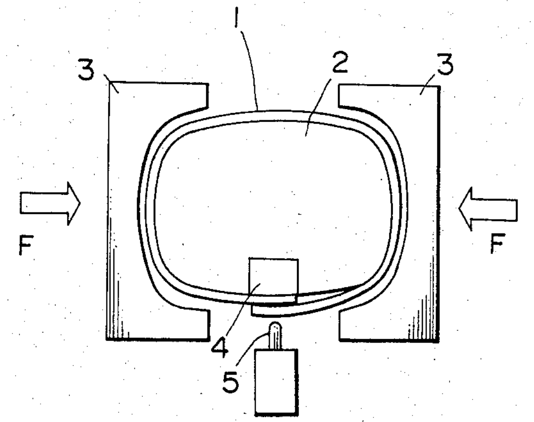
PRIOR ART FIG.3
Figure 4:
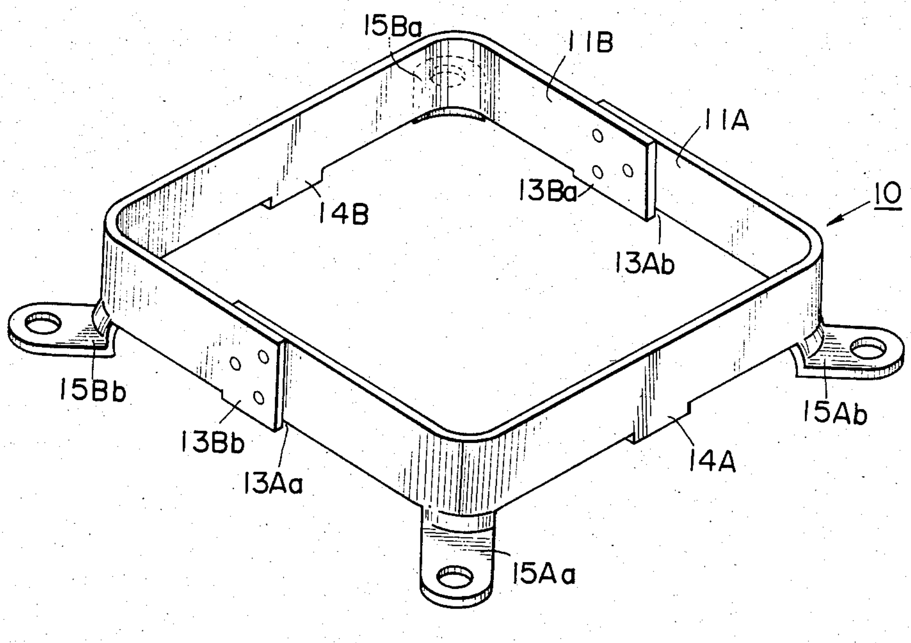
FIG. 4 is a perspective view showing an embodiment of the present invention.
Figure 5:
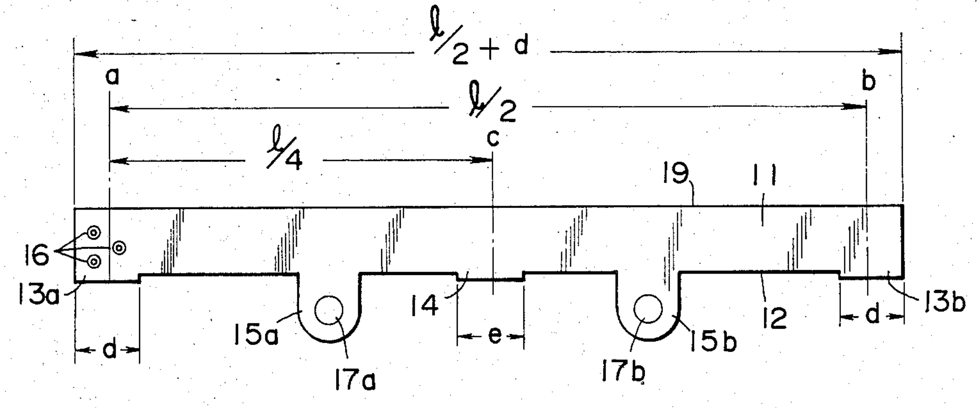
FIG. 5 is a plan view showing a steel metal strip used in the embodiment.

FIG. 4 is a perspective view showing the cathode-ray tube implosion-preventing metal ring 10. In FIG. 4, the metal ring 10 consists of two band-like steel strip members (hereafter referred to as steel strip members) 11A, 11B, the opposing end parts of which are welded together into a ring-like configuration. These metal strip members 11A, 11B are of the same configuration, as shown in a plan view in FIG. 5. The steel strip members 11 shown in FIG. 5 are obtained for example by blanking or punching from a steel plate and are each formed with welding reference projections 13*a*, 13*b*, a bending reference projection 14 and fixing parts 15*a*, 15*b* projecting from one edge 12 of the strip member. These projections 13*a*, 13*b*, 14 are so formed that a length between the centerlines a, b of the welding reference projections 13*a*, 13*b* is equal to one half the peripheral length l of the metal ring 10, and the centerline c of the bending reference projection 14 is, for example, at the center between the centerlines a, b of the projections 13*a*, 13*b*, that is, the length a-c and the length c-b are both equal to l/4. The projections 13*a*, 13*b* are each formed as a rectangular part having a predetermined length d in the longitudinal direction of the steel strip member 11 and uniformly projecting in the widthwise direction from the steel strip member 11. Similarly, the projection 14 is formed as a rectangular part having a predetermined length e in the longitudinal direction of the steel strip member 11 and uniformly projecting in the widthwise direction of the strip member 11. It should be noted that the punching or blanking operation can be performed accurately in this manner within a tolerance less than 0.1 mm and that the length l/2 between the centerlines a, b or the length l/4 between the centerlines a, c or c, b can also be set within a narrow tolerance. Similarly, the length d of the projections 13*a* or 13*b* in the longitudinal direction of the steel strip member and the length e of the projection 14 as well as the mounting position or the size of the fixing parts 15*a*, 15*b* can also be set within the tolerance of the same order as set forth hereinabove.

During the punching or blanking of the steel strip member 11, welding projections 16 are formed in the vicinity of the welding reference projections 13*a* so as to be used as welding points for electric welding, while mounting apertures 17*a*, 17*b* are bored through the fixing parts 15*a*, 15*b*. The other edge 19 of the steel strip member 11 is formed into a straight line, that is, free of projections or recesses.

Figure 6:
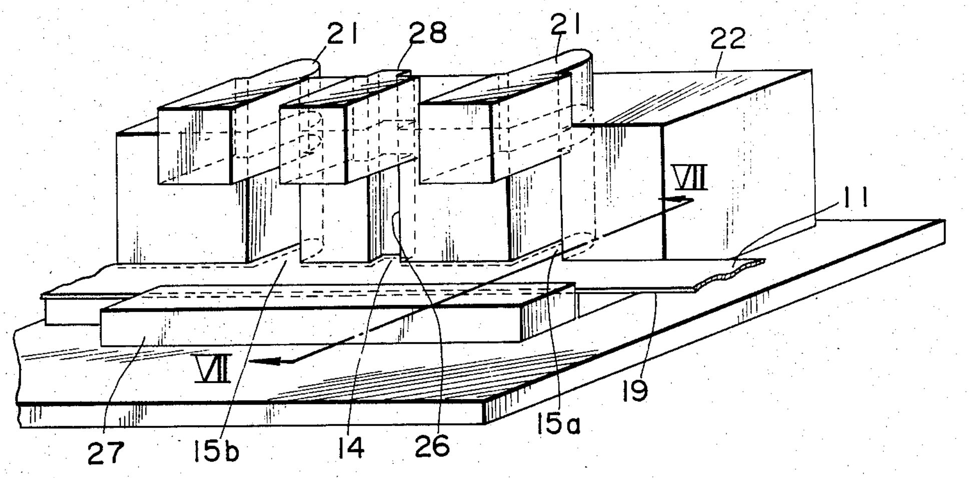
FIGS. 6 and 7 are a perspective view and a sectional view along line VII—VII, respectively, and showing the first machining step of the strip member.
Figure 7:
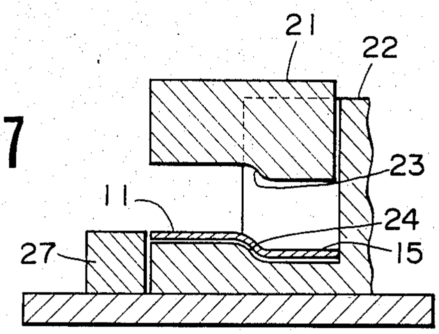

The steel strip member 11 thus obtained by, for example, punching a steel plate, is subjected to a first machining operation by a press shown in FIG. 6. During such first operation, steps are formed at the fixing parts 15*a*, 15*b*. To this end, the portions of a convex mold 21 and a mating concave mold 22 that are in register with the fixing parts are provided with steps 23, 24 as shown in cross-section in FIG. 7, so that the fixing parts 15 are formed with corresponding steps when the fixing parts 15 of the steel strip member 11 are clamped and pressed between these molds 21, 22. At this time, the bending reference projection 14 of the steel strip member 11 is guided in a reference projection guide groove 26 for longitudinal positioning of the steel strip member 11, while the opposite edge 19 of the steel strip member 11 is abutted by a positioning jig 27 for widthwise positioning of the strip member. The reference projection 14 of the strip member 11 thus guided by the guide groove 26 is pressed and held by a block 28 for avoiding positioning error during formation of the steps at the fixing parts.

Figure 8:
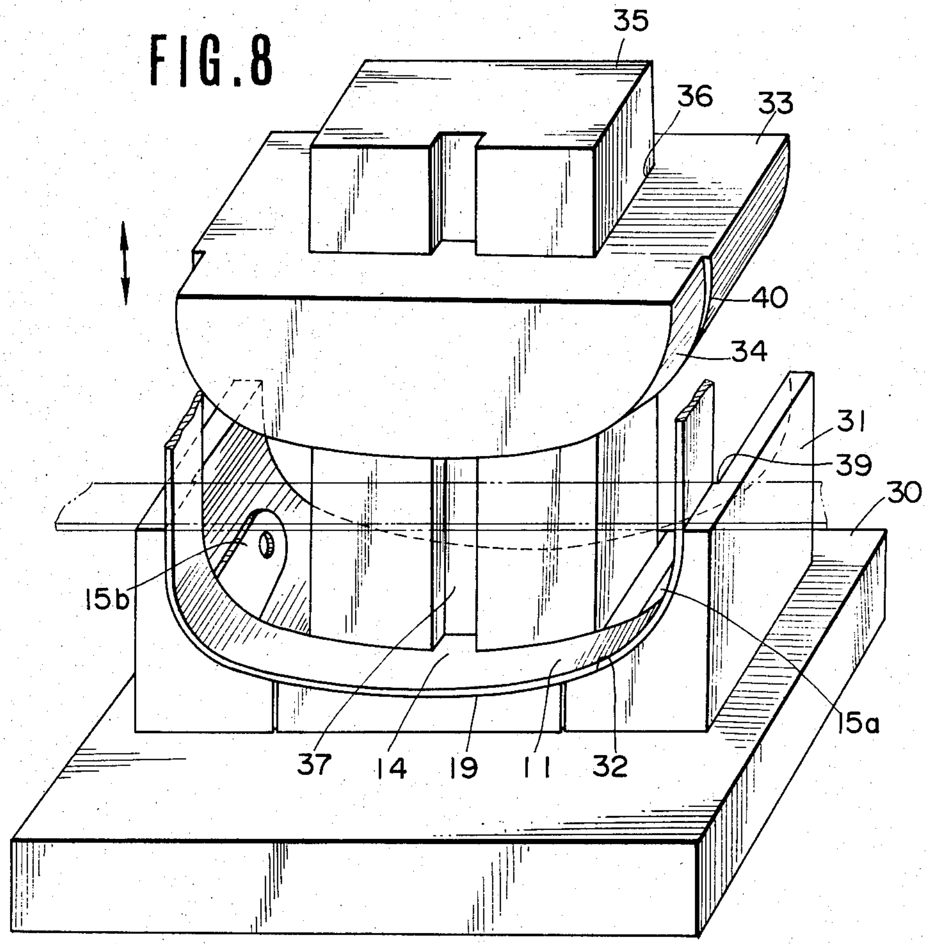
FIGS. 8 and 9 are a perspective view and a side elevational view, respectively, showing the second machining step of the strip member.
Figure 9:
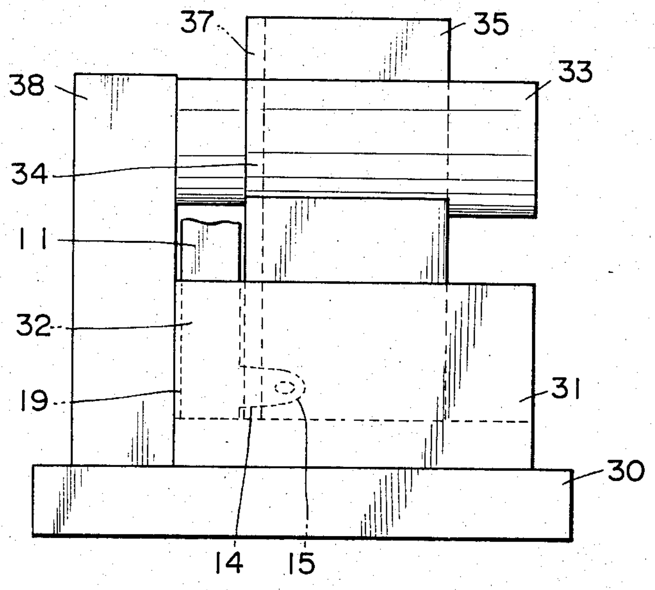

The steel strip part 11 is then subjected, with the aid of a press die shown in FIG. 8, to second machining operation, that is, a bending operation along the contour of the aforementioned mold match line part. Referring to FIG. 8, a curved surface 32 of a concave press die 31 securely mounted on a base block 30 and a curved surface 34 of a convex press die 33 movable vertically in FIG. 8 are similar in shape to the mold match line part. The convex press die 33 has a throughhole 36 adapted for passage of a positioning block 35 extending vertically from approximately the center of the concave press die 31, and is caused to slide vertically in the direction of the double-headed arrow mark while being guided by the positioning block 35. The positioning block has a vertically extending guide groove 37 for guiding the bending reference projection 14 of the steel strip member 11. It is the accuracy in the location of the guide groove 37 and of the bend-forming curved surfaces 32, 34 of the press dies 31, 33 that governs the accuracy in the longitudinal position of the bend of the strip member 11 with respect to the reference projection 14 of the strip member 11. To the front side of the dies 31, 33 shown in FIG. 8, there is mounted a wall-plate block 38 shown in FIG. 9, this wall-plate block abutting on the edge 19 of the steel strip member 11 for widthwise positioning of the strip member. During this second operation, the steel strip member 11 which has passed through the aforementioned first machining operation is supported by both arms of the concave die 31 as shown by the dotted line in FIG. 8, while the strip member 11 is abutted by the wall-plate block 38 shown in FIG. 9 for widthwise positioning of the strip member 11. The strip member 11 is guided at the bending reference projection 14 thereof within the guide groove 37 of the positioning block 35 for longitudinal positioning of the strip member. The convex die 33 is caused to slide down along the positioning block 35 for pressing the strip member 11 by the curved surface 34 for bending the member 11 so as to follow the contour of the curved surfaces 32, 34 of the dies 31, 33. The bending reference projection 14 is guided at this time along the vertical guide groove 37 for preventing longitudinal misregistration of the strip member 11. The dies 31, 33 are formed with stepped portions 39, 40 corresponding to the stepped portions of the fixing parts 15*a*, 15*b* formed during the first machining operation. In these first and second operations, a dimensional error can easily be reduced to less than 0.1 mm.

Figure 10:
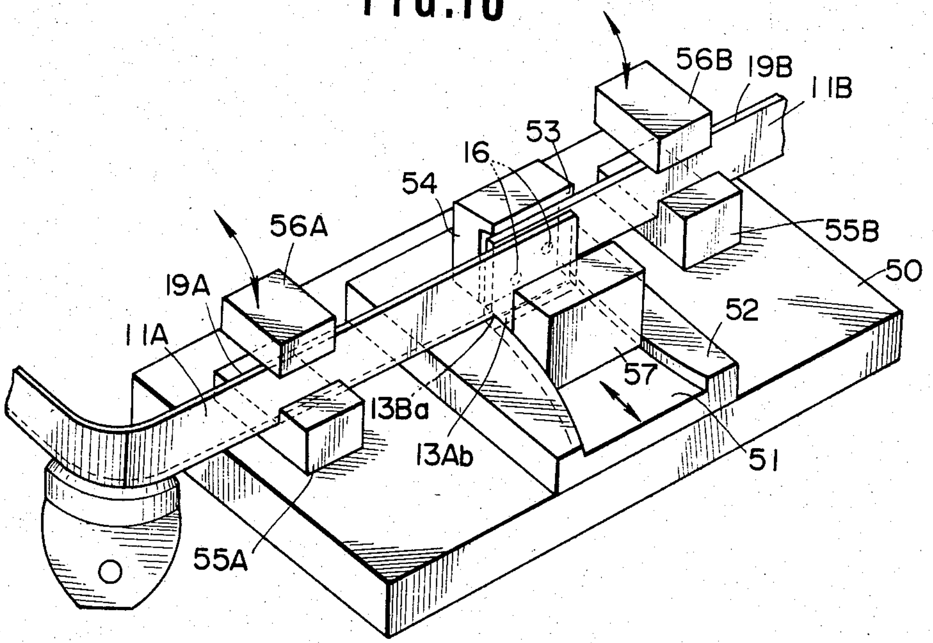
FIG. 10 is a perspective view for explaining the welding operation for the steel strip member.

The welding operation by which the two strip members bent in this manner are welded together to an annular body is explained by referring to FIG. 10. In this figure, a positioning jig 52 having a welding guide groove 51 is securely mounted on a welding base block 50. A back side welding electrode 54 having a visor 53 is mounted upright on the bottom of the guide groove 51 of the positioning jig 52. The guide groove 51 has a width at the position of the electrode 54 which is equal to the width d of the welding reference projection 13 of the steel strip 11. The width of the guide groove 51 is increased from the bottom side towards the foremost open end in such a manner that a welding reference projection 13A*b* at one side of the one steel strip member 11A and a welding reference projection 13B*a* at the same side of the other strip member 11B are overlapped correctly by being guided from the foremost open end towards the bottom side of the guide groove 51 so that accurate longitudinal positioning of the strip members 11A, 11B may be achieved in readiness for welding. A pair of transverse positioning blocks 55A, 55B and a pair of holding blocks 56A, 56B are used for accurate widthwise positioning of the strip members 11A, 11B. The holding blocks 56A, 56B may be rotated as shown by the double-headed arrow mark so as to abut on the other side edges 19A, 19B of the steel strip members 11A, 11B during welding. A front-side welding electrode 57 slidably guided in the guide groove 51 is moved towards the backside welding electrode 54 so that the strip members 11A, 11B are clamped in the vicinity of the welding reference projections 13A*b*, 13B*a* thereof between these electrodes 54, 57. At this time, a large current is caused to flow mainly at the welding projections 16 shown in FIG. 5 for electrically welding the strip members 11A, 11B to each other. The other ends of the strip members 11A, 11B are welded to each other in the similar manner as the strip members are positioned correctly with the aid of the welding reference projections 13A*a*, 13B*b* at the other ends of the strip members 11A, 11B, so that a unitary annular body, that is, the cathode-ray tube implosion-proof metal ring 10 is completed. The error in the peripheral length of the metal ring (overall length: 1100 mm) may be reduced in such a manner that the dispersion $3\sigma$ (where $\sigma$ represents standard deviation) is included within $\pm 0.3$ mm so that higher accuracy may be achieved during mass production.

According to the conventional practice, the strip members are welded to each other by stressing the strip members in tension during the preceding operation during which the peripheral length of the metal ring is determined. It is therefore necessary that the springback of the strip member be taken into account in selecting the equipment conditions. Moreover, since the springback is changed in dependence upon fluctuations in the tension applied to the steel strip member, considerable difficulties are encountered in the mass production equipment condition control if the tolerance of the overall peripheral length of the metal ring (equal to about 1100 mm) is to be maintained for example within $\pm 0.6$ mm.

According to the embodiment of the present invention, the strip members 11 are not stressed in tension during the pre-welding operation during which the overall peripheral length of the metal ring is ultimately determined, so that the springback of the strip members 11 is practically reduced to zero and the dispersion less than $\pm 0.3$ mm may be easily achieved for the overall peripheral length of the metal ring of approximately 1100 mm with resultingly improved productivity and product quality.

The width of the metal ring 10 is set as a function of the clamping tension applied to the cathode-ray tube and the presence of recesses or portions of reduced thickness are not desirable since the stress tends to be locally concentrated in this case in these recesses or portions. According to the present invention, since the projections 13, 14 act as reference for machining, there is caused no inconvenience such as reduced clamp tension. Moreover, in consideration that the strength of the strip member may be affected at the welding position thereof, the strip member is increased in width in this position by the welding reference projection 13, so that the projection 13 plays the role of the reinforcement of the weld and the welding reference simultaneously.

In addition, the strip members 11 can be bent highly accurately automatically by means of the bending reference projection 14, while being welded highly accurately automatically by means of the welding reference projections received in the guide groove 51 of the positioning jig 51.

From the foregoing it is seen that the arrangement of the present invention provides a metal ring preventing implosion of cathode-ray tube, according to which the necessity of prestressing the metal strip member in tension during the pre-welding operation which determines the peripheral length of the metal ring is eliminated and the strip member can be positioned longitudinally automatically by means of the welding reference projections so that the metal rings can be mass produced with high dimensional accuracy.

We claim:

1. A metal ring adapted to be fitted on a maximum outer length part of a cathode-ray tube for preventing the implosion of the cathode-ray tube, said metal ring comprising at least two metal strip members each formed with the same shaped welding reference projections at the end portions thereof, said strip members including fixing parts between said end portions and a central bending reference projection between said fixing parts, said strip members being bent while being positioned by means of said central bending reference projection so that an annular body formed by connecting these metal strip members has a shape similar to said maximum outer peripheral length part of the cathode-ray tube, said metal strip members being welded together while being positioned by overlapping said welding reference projections.

2. The metal ring according to claim 1 characterized in that the welding reference projections are each a rectangular part formed on each metal strip member which projects uniformly in the widthwise direction thereof and has a predetermined length in the longitudinal direction of the strip member.

3. The metal ring according to claim 1 characterized in that said central bending reference projection is a rectangular part formed on each metal strip member which projects uniformly in the widthwise direction thereof and has a predetermined length in the longitudinal direction of the strip member.

4. The metal ring according to claim 1 characterized in that a step is formed on at least the part of each metal strip member including the fixing part.

5. The metal ring according to claim 1 characterized in that said metal strip members are welded together without prestressing these metal strip members in tension.

* * * * *